United States Patent
Seth et al.

(10) Patent No.: US 8,720,560 B2
(45) Date of Patent: May 13, 2014

(54) APPARATUS AND METHOD FOR CEMENTING A BOREHOLE

(75) Inventors: Kushal Seth, Houston, TX (US); Gregory A. Caraway, The Woodlands, TX (US); Allen D. Gabrysch, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 215 days.

(21) Appl. No.: 13/268,115

(22) Filed: Oct. 7, 2011

(65) Prior Publication Data

US 2013/0087333 A1  Apr. 11, 2013

(51) Int. Cl.
*E21B 33/13* (2006.01)
*E21B 36/00* (2006.01)

(52) U.S. Cl.
USPC .................. 166/288; 166/177.4; 166/292

(58) Field of Classification Search
None
See application file for complete search history.

(56) References Cited

U.S. PATENT DOCUMENTS

| 7,013,979 | B2 | 3/2006 | Richard |
| 7,318,481 | B2 | 1/2008 | Richard |
| 2009/0000793 | A1* | 1/2009 | Guillot et al. ................. 166/380 |

* cited by examiner

*Primary Examiner* — Zakiya W Bates
(74) *Attorney, Agent, or Firm* — Cantor Colburn LLP

(57) ABSTRACT

In aspects, the disclosure provides a method for cementing a borehole that includes selecting a location in the borehole for cementing. The method further includes providing a cement slurry comprising a cement and shape memory members having a first shape, the shape memory members configured to expand from the first shape to a second shape upon application of heat to the shape memory members, placing the cement slurry in the selected space and heating the shape memory members in the selected space to attain the second shape.

22 Claims, 2 Drawing Sheets

APPARATUS AND METHOD FOR CEMENTING A BOREHOLE

BACKGROUND OF THE DISCLOSURE

1. Field of the Disclosure

The disclosure relates generally to apparatus and methods for cementing boreholes.

2. Description of the Related Art

Cementing is a technique employed during many phases of borehole operations. For example, a cement slurry may be employed to cement or secure various casing strings and/or liners in a well. In other cases, cementing may be used in remedial operations to repair casing and/or to achieve formation isolation. In still other cases, cementing may be employed to isolate selected zones in the borehole and to temporarily or permanently abandon a borehole. Several factors may affect the performance of the cement in the borehole (or "wellbore"), including, but not limited to, length of the cement column in the borehole, formation pore pressure, formation fracture gradient and cement slurry density. In some embodiments, the density of the cement or cement slurry may affect the structural integrity of the formation rock. For example, a cement slurry with a heavy density may impart increased pressure and force on the formation rock. The increased pressure can lead to breakdown of the formation, reducing borehole integrity. In addition, the cement slurry hardens or sets after being directed to a selected location in the borehole and may expand and/or contract over time. Expansion and contraction of the cement slurry after hydration or hardening can cause cracks to develop, thereby allowing fluids to leak from the formation.

SUMMARY OF THE DISCLOSURE

In aspects, the disclosure provides a method for cementing a borehole that includes selecting a location in the borehole for cementing. The method further includes providing a cement slurry comprising a cement and shape memory members having a first shape, the shape memory members configured to expand from the first shape to a second shape upon application of heat to the shape memory members, placing the cement slurry in the selected space and heating the shape memory members in the selected space to attain the second shape.

In another aspect, a system for cementing a selected location in a borehole that includes a mixer at the surface configured to form a cement slurry that includes a cement and shape memory members having a first shape, the shape memory members configured to expand from the first shape to a second shape upon application of heat to the shape memory members. The system also includes a pump at the surface configured to pump the cement slurry into the selected location via a tubular in the borehole.

Examples of the more important features of the disclosure have been summarized rather broadly in order that detailed description thereof that follows may be better understood, and in order that the contributions to the art may be appreciated. There are, of course, additional features of the disclosure that will be described hereinafter and which will form the subject of the claims relating to this disclosure.

BRIEF DESCRIPTION OF THE DRAWINGS

The advantages and further aspects of the disclosure will be readily appreciated by those of ordinary skill in the art as the same becomes better understood by reference to the following detailed description when considered in conjunction with the accompanying drawings in which like reference characters generally designate like or similar elements throughout the several figures of the drawing and wherein.

DETAILED DESCRIPTION OF THE EMBODIMENTS

Figure 1:
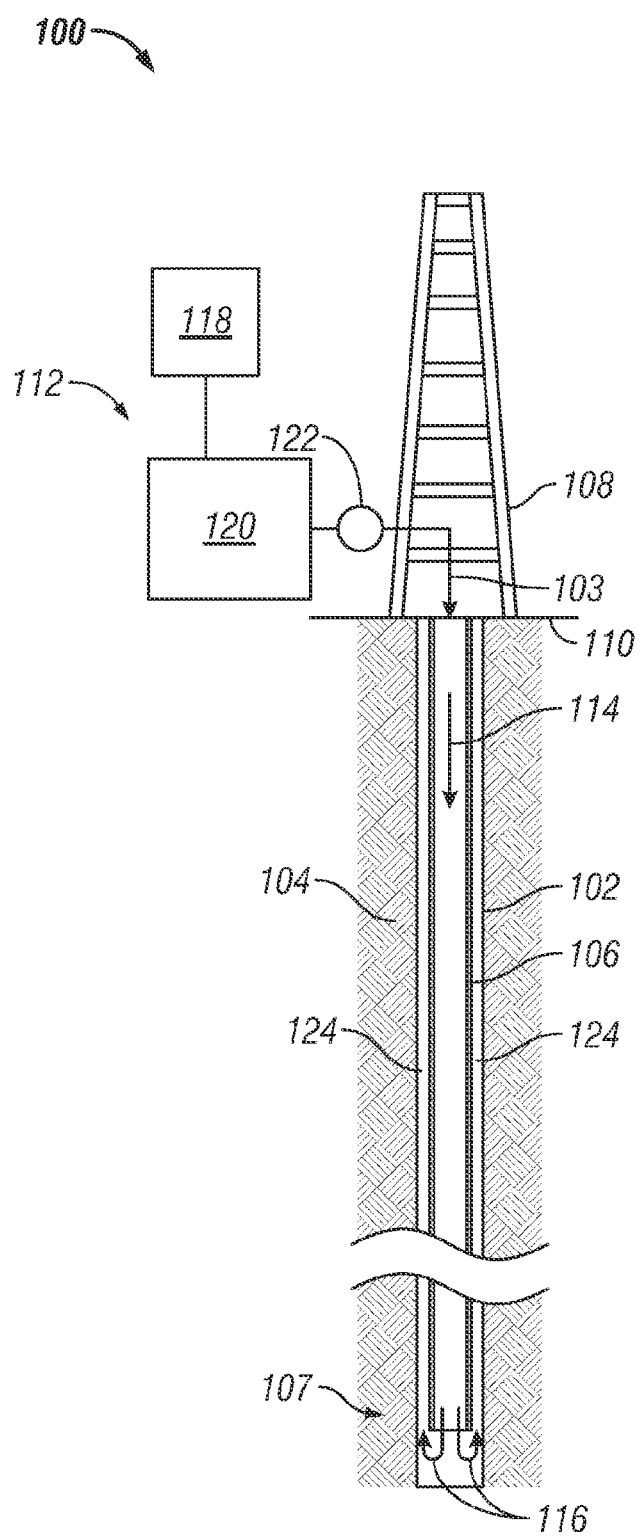
FIG. 1 is a schematic diagram of an exemplary borehole system in accordance with one embodiment of the present disclosure.

FIG. 1 shows a diagram of an exemplary borehole system 100 made according to one embodiment of the disclosure that may be utilized for cementing a borehole 102. In an embodiment, a cement slurry 103 (also referred to as "slurry" or "cement") is directed downhole to cement 102 the borehole. The borehole 102 may include vertical, directional, lateral and various degrees from vertical approaching lateral boreholes formed in the formation 104 for storage and/or retrieval of fluids, such as sequestration or hydrocarbon production. As depicted, a tubular 106 is disposed in the borehole 102, wherein the tubular 106 extends from a surface 110 to an end portion 107 of the borehole. A derrick 108 is located at the surface 110 to support borehole equipment, including the tubular 106. In the depicted embodiment, a slurry system 112 is located proximate the surface. The slurry system 112 is configured to direct the cement slurry 103 downhole, as shown by arrows 114 and 116. The cement slurry 103 is directed downhole by an additive source 118, a slurry source 120 and a pump 122.

As depicted, the additive source 118 provides an additive, such as shape memory members, to be mixed with a cement slurry in the slurry source 120, prior to being directed downhole by the pump 122. In another embodiment, the shape memory members are added to and mixed with the cement slurry prior to being placed in the slurry source 120. Exemplary shape memory members are composed of a polymer material and have a density that is less than that of the cement slurry. Thus, the addition of shape memory members reduces the density of the slurry. The lower density of the cement slurry (shape memory members combined/mixed with cement) reduces hydrostatic pressure within the borehole 102 as the cement slurry is pumped downhole. The reduced hydrostatic pressure imparts less force on the formation 104 wall, thereby reducing unwanted degradation and damage to the formation 104. Further, the pumping force of pump 122 to direct the cement slurry is lower due to the reduced density of the cement slurry, thereby saving power and reducing wear on borehole equipment. Further, a lower capacity pump 122 may be used, thereby saving costs for the borehole system 100. In addition, the shape memory members are activated, by exposure to an energy or activating agent, wherein the expanded shape memory members fill cracks in the cement that may occur during hydrating and/or hardening.

An exemplary cement slurry includes dry cement combined with a water solution to create a wet cement or slurry. The water solution can be fresh water, drill water, sea water, brackish water, produced, flowback, mono-valent or di-valent brines or another water solution. This may be accomplished by use of selected mixers, including hydraulic jet mixers, re-circulating mixers or batch mixers. In one embodiment the cement slurry used in the well cementing process is "Portland cement", and it is calibrated with additives to form a selected type or class of cement. The additive chosen for the cement is employed based on the application. Additives may include extenders can be used to expand the cement, decrease the density and thus reduce the cost of cementing. Other additives include accelerators to decrease the setting time required for the cement and retarders are used to extend the cement setting time.

In an embodiment, shape memory members comprise a material with shape memory or shape-conforming materials (also referred to as "shape-memory materials"), members, apparatus and/or devices made using such materials and methods of their use. In one aspect, cement slurry additives are made from a suitable material, including, but not limited to, syntactic and conventional memory foams, a shape memory polymer (SMP), and/or a combination thereof. As used herein, the term "memory" refers to the capability of a material to withstand certain stresses, such as external mechanical compression, vacuum and the like, but to then return, under appropriate conditions, such as exposure to a selected form of energy, often heat, to the material's original size and shape.

In certain non-limiting embodiments, the additive members may include a foam that may be either open cell or closed cell. The selection of a particular foam will generally depend upon the desired properties of the cement slurry. Open cell foams, for example, are those foams wherein a significant proportion of the cell walls that form during the foaming process are either broken during that process, or are broken thereafter, by any suitable method, such as the application of mechanical forces. In aspects, such open cell structure may be sufficiently porous and/or permeable so as to enable the passage of fluids therethrough and the storage of fluids within. In contrast, closed cell foams may be better suited for use in fluid sealing apparatus, where it is desired to prevent most or all passage of materials, whether liquid, solid, or both, therethrough.

In other aspects, the shape memory materials may include any material capable of withstanding typical downhole conditions without experiencing an unacceptable level of degradation. In non-limiting embodiments, such material may be prepared from a thermoplastic or thermoset medium. This medium may contain a number of additives and/or other formulation components that alter or modify the properties of the resulting shape memory material. For example, in some non-limiting embodiments the shape memory material may be either thermoplastic or thermoset in nature, and may be selected from a group consisting of polyurethanes, polystyrenes, polyethylenes, epoxies, rubbers, fluoroelastomers, nitriles, ethylene propylene diene monomers (EPDM), other polymers, combinations thereof, and the like.

In aspects, the shape memory material may be described as having a "shape memory" property. As used herein, the term "shape memory" refers to the capacity of the material to be heated above the material's glass transition temperature (GTT), and then to be compressed and cooled to a lower temperature, retaining its compressed state. However, the same material may then be restored to its original shape and size, i.e., its pre-compressed state, by reheating that material to close to or above its glass transition temperature (GTT). This subgroup, which may include certain syntactic and conventional foams, may be formulated to achieve a desired GTT for a given application. For instance, a foaming medium may be formulated to have a GTT slightly below the anticipated downhole temperature at the depth at which the material will be used. The chosen material may include a conventional foam or a combination of different foams and other materials. Further, the foam medium may be formulated to have a GTT below the anticipated temperature of the selected location within the wellbore where cement slurry composition is directed. In another embodiment where the borehole 102 temperatures are below the GTT, an activating agent may be added to the slurry containing the shaped memory members enabling the shape memory polymers to regain their original or expanded shape.

Still referring to FIG. 1, the initial (as-formed) shape of the shape memory member comprised of the shape memory material may vary, though an substantially spherical, cylindrical or squared shape is well-suited to be mixed and distributed within a cement slurry. Once the member of shape memory material is compressed and cooled below the GTT, it is added to the cement slurry, which may then be directed downhole. In an embodiment, the cement slurry is pumped along the tubular 106 wherein it is released near the end portion 107 of the borehole and directed into an annulus 124, as shown by arrows 116. The cement slurry may also be utilized to combat a "loss of circulation" zone which may occur in the wellbore or casing while drilling, static, production or completion operations are in process. The exemplary cement slurry then hardens in the desired location, such as annulus 124, where the cement slurry as the shape memory members expand due to exposure to a activation, such as exposure temperature greater than the shape memory members' GTT. For example, shape memory members are first heated to a temperature above the shape memory members' GTT and compressed to a first shape and then cooled to retain the compressed shape. The exemplary GTT of the shape memory members is about 150 degrees F. The compressed shape memory members are then added to a cement slurry proximate the surface 110, wherein the cement slurry and shape memory members are maintained at a temperature less than about 130 degrees Fahrenheit (F), such as about 100 degrees F. The cement slurry and the shape memory members are then directed into the desired location, such as annulus 124, by the pump 122, between the tubular 106 and borehole 102 wall. The temperature of formation 104 and borehole 102 is higher than the shape memory member GTT, and thus causes the shape memory members to expand to a second expanded shape. Thus, a downhole treatment, such as by heating or exposing to an activating agent, causes the shape memory members to expand to fill cracks that may form in the cement during hydrating and/or hardening. Exemplary borehole 102 temperatures include a temperature about equal to or greater than 150 degrees F.

After being directed to a selected location in the borehole 102, the shape memory members expand during hardening of the slurry to reduce development of cracks in the hydrating cement thereby preventing flow of formation fluid into the annulus 124. Further, the shape memory members expand within the cement slurry to conform the slurry as it hardens or sets to contours of the borehole 102 walls. Thus, the shape memory members added to the cement slurry improve sealing and isolation of selected cemented areas of the borehole 102. In addition, the shape memory members cause a reduction in density. For example, the density of the cement slurry with the expanded shape members is less than about 14 pounds per gallon, wherein the density of the cement slurry is selected to reduce pressure on a borehole wall. Further, in an embodiment, the shape memory members may act as interlocking agents with the cement particles and molecules. This interlocking with the cement molecules can help to mechanically strengthen the cement structure.

Figure 2:
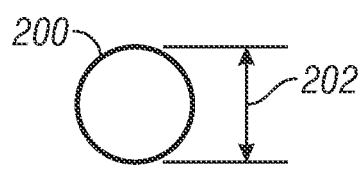
FIGS. 2 and 3 are side views of an exemplary embodiment of a shape memory member to be added to a cement slurry for the exemplary borehole system in accordance with one embodiment of the present disclosure.
Figure 3:
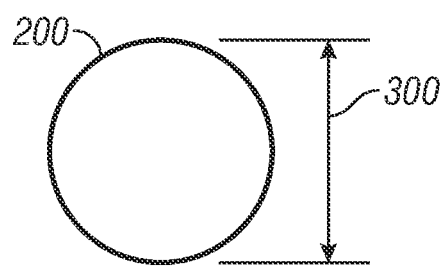

FIGS. 2 and 3 are side views of exemplary embodiments of a shape memory member 200 to be added to a cement slurry, as discussed above. The depicted shape memory member 200 is spherical, but it should be understood that the members may be any suitable shape. The shape memory member 200 comprises a shape memory material, such as a shape memory polymer. FIG. 2 illustrates the shape memory member 200 in a compacted shape, wherein the shape memory member 200 is compacted at a temperature at or above a GTT of the shape memory material, then cooled below the GTT. The compacted shape memory material has a diameter 202. The depicted shape memory member 200 is added to a cement slurry and directed downhole, as described above. FIG. 3 illustrates the shape memory member 200 in an expanded shape, wherein the shape memory material is heated to a temperature about equal to or greater than the GTT of the shape memory material. After being directed downhole and into the annulus 124, the shape memory member 200 is heated to and/or above the GTT in the borehole 102. The depicted shape memory member 200 has a diameter 300 when expanded, wherein the diameter 300 is greater than diameter 200.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

The invention claimed is:

1. A method for cementing a borehole, comprising:
   selecting a location in the borehole for cementing;
   mixing a cement slurry at a surface location, the cement slurry comprising a cement and shape memory members having a first shape, the shape memory members configured to expand from the first shape to a second shape upon application of heat to the shape memory members;
   pumping the cement slurry from the surface location into the selected; location; and
   heating the shape memory members in the selected location to attain the second shape.

2. The method of claim 1, wherein pumping the cement slurry comprises pumping the cement slurry downhole via a tubular.

3. The method of claim 1, wherein the first shape is obtained by compressing the shape memory members at a temperature at or above a glass transition temperature of the shape memory material and cooling the compressed shape memory members to a temperature lower than the glass transition temperature.

4. The method of claim 3, wherein heating the shape memory members comprises heating the cement slurry downhole to about or above the glass transition temperature.

5. The method of claim 4, wherein heating the shape memory members causes the shape memory members to expand to fill voids formed in the cement slurry after it is placed in the selected space.

6. The method of claim 1, further comprising adding an activating agent to attain the second shape.

7. The method of claim 1, wherein:
   the selected location is an annulus between a tubular and a wall of the borehole.

8. The method of claim 1, wherein providing the cement slurry comprises using a selected amount of the shape memory members sufficient to cause the cement slurry to conform to a borehole wall when the shape memory members are heated.

9. The method of claim 1, wherein providing the cement slurry comprises selecting a density of the shape memory members to reduce incidence of cracking when the cement slurry hydrates or hardens in the selected space.

10. The method of claim 1, wherein providing the cement slurry comprises selecting a density of the shape memory members to reduce pressure on a borehole wall as compared to a cement slurry without the shape memory members.

11. A method for cementing a selected location in a borehole, comprising:
    compacting shape memory members at a first temperature from an expanded shape to a compacted shape;
    cooling the shape memory members in the compacted shape to a second temperature lower than the first temperature;
    mixing the shape memory members in the compacted shape into a cement to form a cement slurry at a surface location;
    directing the cement slurry from the surface location downhole to fill the selected location with the cement slurry; and
    treating the cement slurry downhole to cause the shape memory members to attain the expanded shape.

12. The method of claim 11 further comprising allowing the cement slurry to hydrate in the selected location with the shape memory members in the expanded shape.

13. The method of claim 11, wherein selected location includes a borehole wall and wherein the cement slurry includes an amount of the shape memory members that is sufficient to cause the cement slurry to conform to a borehole wall at the selected location as the cement slurry hydrates.

14. The method of claim 11, wherein an amount of shape memory members in the cement slurry is selected to reduce incidence of cracking when the cement slurry hardens in the selected space.

15. The method of claim 14, wherein a density of the cement slurry is selected to reduce pressure on a borehole wall.

16. The method of claim 11, wherein treating the cement slurry downhole comprises using an activating agent to cause the shape memory members to attain the expanded shape.

17. The method of claim 11, wherein the cement slurry is mechanically strengthened by the shape memory members interlocking with particles of the cement slurry.

18. The method of claim 11, wherein directing the cement slurry comprises directing the cement slurry from the surface location at less than about 130 degrees Fahrenheit.

19. The method of claim 11, wherein treating the cement slurry downhole comprises heating the cement slurry downhole to or above the first temperature to cause the shape memory members to attain the expanded shape.

20. The method of claim 19, wherein heating the cement slurry downhole to or above the first temperature comprises heating the cement slurry to greater than about 150 degrees Fahrenheit.

21. A system for cementing a selected location in a borehole, comprising:
    a mixer at the surface configured form a cement slurry comprising a cement and shape memory members having a first shape, the shape memory members configured to expand from the first shape to a second shape upon application of heat to the shape memory members; and
    a pump at the surface configured to pump the cement slurry into the selected location via a tubular in the borehole.

22. The system of claim 21, wherein the shape memory members are configured to be pumped to the selected location in the first shape and then expand to the second shape at the selected location when the cement slurry hydrates.

* * * * *